United States Patent
Jemiolo et al.

(10) Patent No.: US 10,007,956 B2
(45) Date of Patent: *Jun. 26, 2018

(54) SYSTEMS AND METHODS OF DATA MINING TO CUSTOMIZE SOFTWARE TRIAL DEMONSTRATIONS

(71) Applicant: salesforce.com, inc., San Francisco, CA (US)

(72) Inventors: Daniel Everett Jemiolo, Cary, NC (US); Beau David Cronin, Oakland, CA (US)

(73) Assignee: salesforce.com, Inc., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/798,198

(22) Filed: Oct. 30, 2017

(65) Prior Publication Data

US 2018/0047115 A1 Feb. 15, 2018

Related U.S. Application Data

(63) Continuation of application No. 14/609,281, filed on Jan. 29, 2015, now Pat. No. 9,805,427.

(51) Int. Cl.
- *G06F 9/44* (2018.01)
- *G06Q 50/00* (2012.01)
- *G06Q 30/02* (2012.01)

(52) U.S. Cl.
CPC ......... *G06Q 50/01* (2013.01); *G06Q 30/0276* (2013.01)

(58) Field of Classification Search
CPC .................................................. G06Q 50/01
USPC .......................................................... 717/102
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

U.S. Appl. No. 14/609,281—Office Action dated Feb. 3, 2016, 65 pages.

(Continued)

*Primary Examiner* — Lewis A Bullock, Jr.
*Assistant Examiner* — Theodore Hebert
(74) *Attorney, Agent, or Firm* — Holland & Hart LLP

(57) ABSTRACT

The technology disclosed describes systems and methods for delivering software trial demonstrations that are customized, with features identified as interesting to a software demonstration candidate, by mining biographical and behavioral data of the candidate. The technology further discloses systems and methods for the customization of trial demonstrations with software usage stories that reflect a software demonstration candidate's interests, identified by analyzing mined biographical and behavioral data about the candidate.

19 Claims, 9 Drawing Sheets

Customization Environment

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,721,713 B1* | 4/2004 | Guheen ................ G06Q 50/01 705/1.1 |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2* | 3/2008 | Cook ................ G06Q 10/06311 705/7.13 |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 7,890,581 B2* | 2/2011 | Rao ................ G06Q 30/08 709/201 |
| 7,996,255 B1 | 8/2011 | Shenoy et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1* | 12/2011 | Hubbard ................ G06Q 30/02 705/14.52 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,688,491 B1 | 4/2014 | Shenoy et al. |
| 8,756,275 B2 | 6/2014 | Jakobson |
| 8,769,004 B2 | 7/2014 | Jakobson |
| 8,769,017 B2 | 7/2014 | Jakobson |
| 8,845,337 B1* | 9/2014 | Hu ................ G09B 25/00 434/365 |
| 8,905,763 B1* | 12/2014 | Hu ................ G09B 19/00 434/365 |
| 9,058,194 B2* | 6/2015 | Murray ................ G06F 9/4445 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0192029 A1* | 10/2003 | Hughes ................ G06F 8/20 717/101 |
| 2003/0204427 A1 | 10/2003 | Gune et al. |
| 2003/0206192 A1 | 11/2003 | Chen et al. |
| 2003/0225730 A1* | 12/2003 | Warner ................ H04M 3/493 |
| 2004/0001092 A1 | 1/2004 | Rothwein et al. |
| 2004/0010489 A1* | 1/2004 | Rio ................ G06F 17/30595 |
| 2004/0015981 A1 | 1/2004 | Coker et al. |
| 2004/0027388 A1* | 2/2004 | Berg ................ G06Q 10/10 715/781 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0059256 A1* | 3/2008 | Lynch ................ G06Q 10/063 705/7.24 |
| 2008/0249972 A1 | 10/2008 | Dillon |
| 2009/0063415 A1 | 3/2009 | Chatfield et al. |
| 2009/0100342 A1 | 4/2009 | Jakobson |

(56) References Cited

U.S. PATENT DOCUMENTS

| | | | |
|---|---|---|---|
| 2009/0177744 A1* | 7/2009 | Marlow | G06Q 10/10 709/204 |
| 2011/0218958 A1 | 9/2011 | Warshaysky et al. | |
| 2011/0247051 A1 | 10/2011 | Bulumulla et al. | |
| 2012/0042218 A1 | 2/2012 | Cinarkaya et al. | |
| 2012/0209586 A1* | 8/2012 | Mieritz | G06F 9/455 703/22 |
| 2012/0233137 A1* | 9/2012 | Jakobson | G06F 3/04847 707/695 |
| 2012/0265647 A1* | 10/2012 | Negrillo | G06F 17/30967 705/26.62 |
| 2012/0290407 A1 | 11/2012 | Hubbard et al. | |
| 2013/0044959 A1* | 2/2013 | Mitchell | G06Q 30/02 382/217 |
| 2013/0212497 A1* | 8/2013 | Zelenko | G06F 17/30867 715/760 |
| 2013/0247216 A1* | 9/2013 | Cinarkaya | H04L 67/02 726/27 |
| 2014/0280890 A1* | 9/2014 | Yi | H04L 67/22 709/224 |
| 2014/0289611 A1* | 9/2014 | Norwood | H04L 51/046 715/234 |
| 2014/0304036 A1* | 10/2014 | Sjoblom | G06Q 30/0269 705/7.32 |
| 2015/0025971 A1* | 1/2015 | Shipley | G06Q 30/0257 705/14.55 |
| 2015/0106208 A1* | 4/2015 | Lancar | G06Q 30/0269 705/14.66 |
| 2015/0302443 A1* | 10/2015 | Vu | G06Q 30/0214 705/14.16 |

OTHER PUBLICATIONS

U.S. Appl. No. 14/609,281—Office Action dated Sep. 13, 2016, 53 pages.
U.S. Appl. No. 14/609,281—Office Action dated Dec. 29, 2016, 71 pages.
U.S. Appl. No. 14/609,281—Response to Office Action dated Feb. 3, 2016 filed May 2, 2016, 16 pages.
U.S. Appl. No. 14/609,281—Response to Office Action dated Sep. 13, 2016 filed Nov. 17, 2016, 14 pages.
U.S. Appl. No. 14/609,281—Response to Office Action dated Dec. 29, 2016 filed Mar. 28, 2017, 23 pages.
U.S. Appl. No. 14/609,281—Notice of Allowance dated Jun. 28, 2017, 19 pages.

* cited by examiner

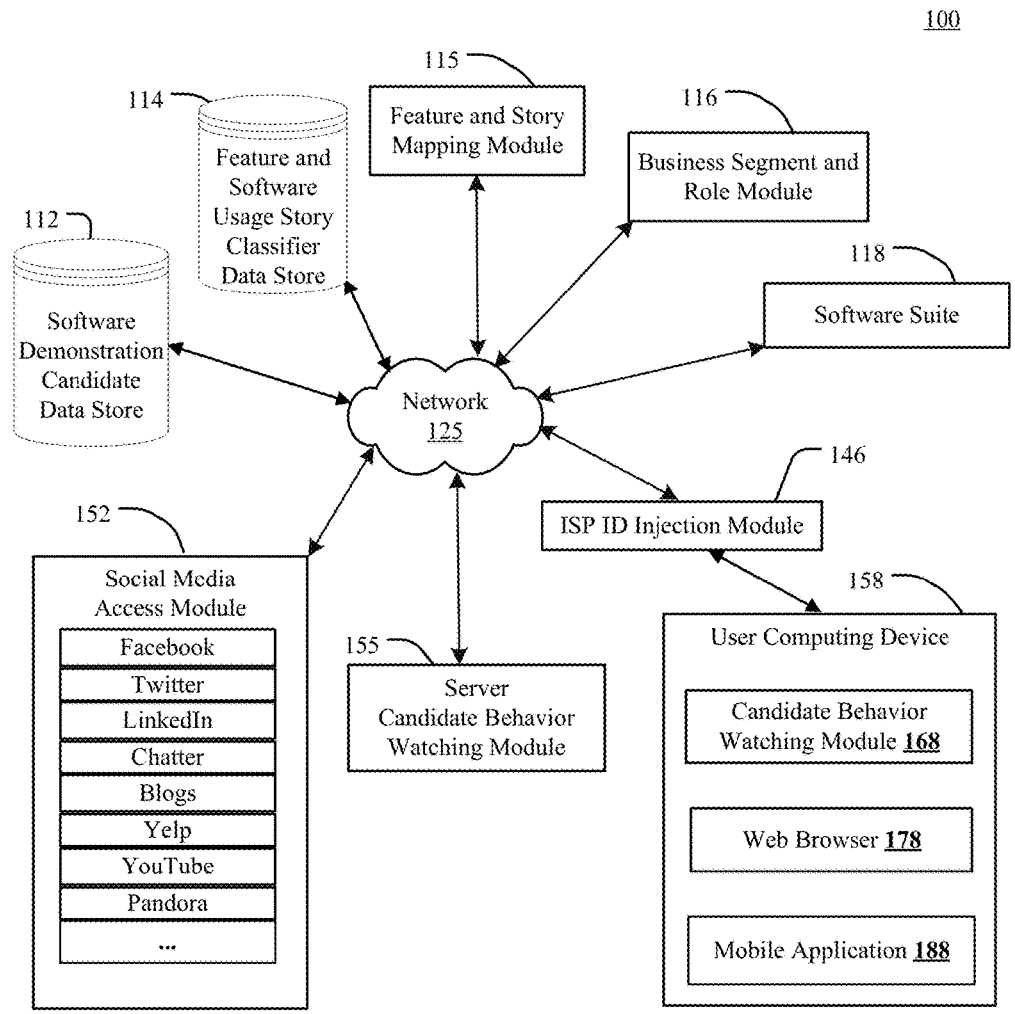
Fig. 1 Customization Environment

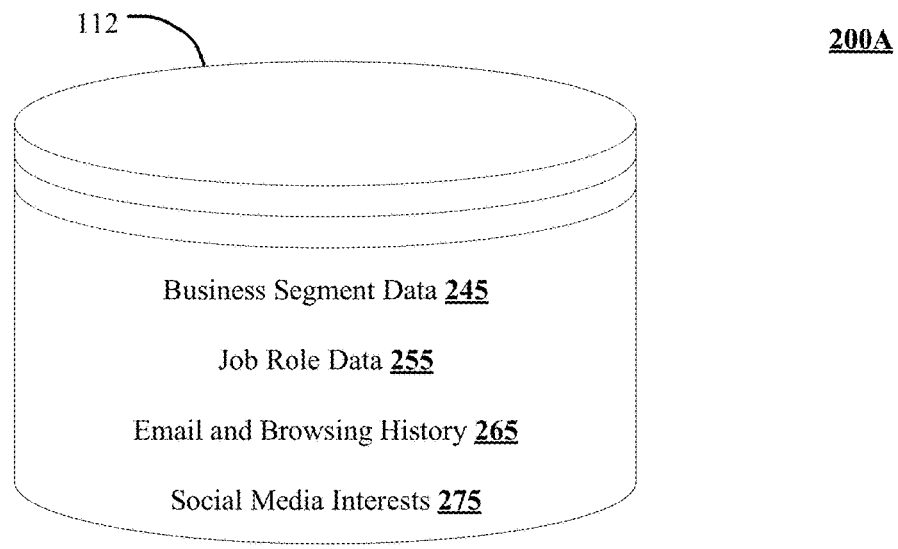
FIG. 2A Software Demonstration Candidate Data Store
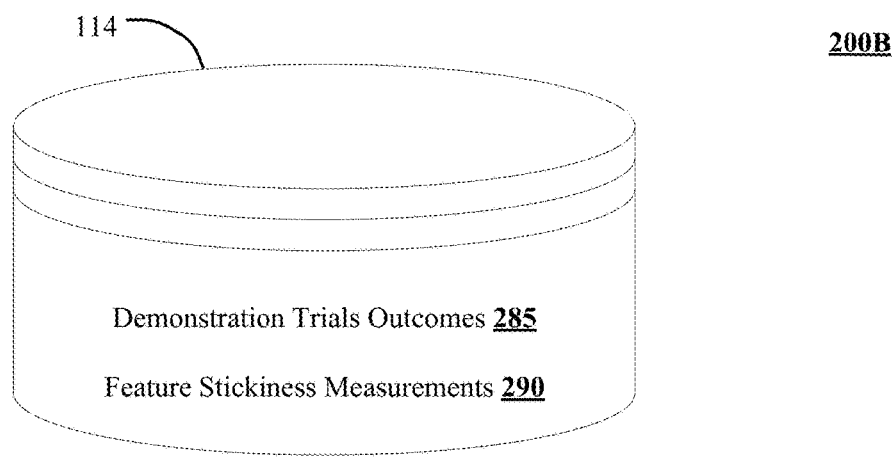
FIG. 2B Feature and Software Usage Story Classifier Data Store

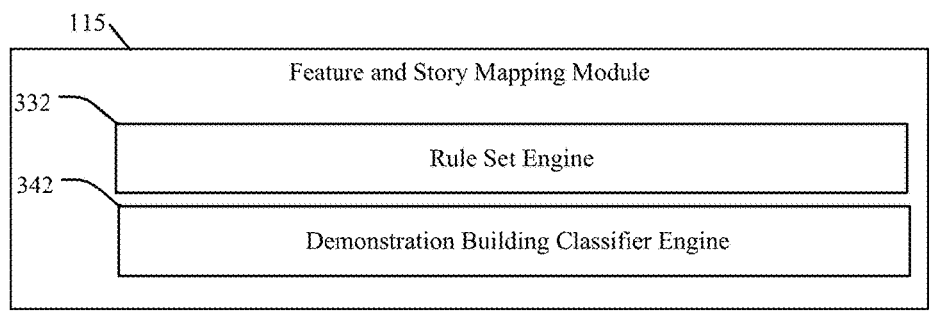
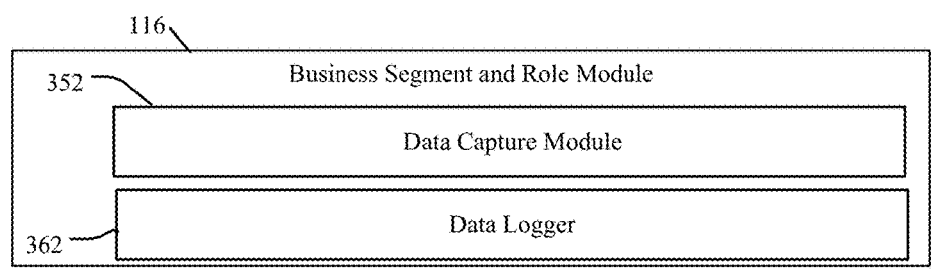
FIG. 3 Modules

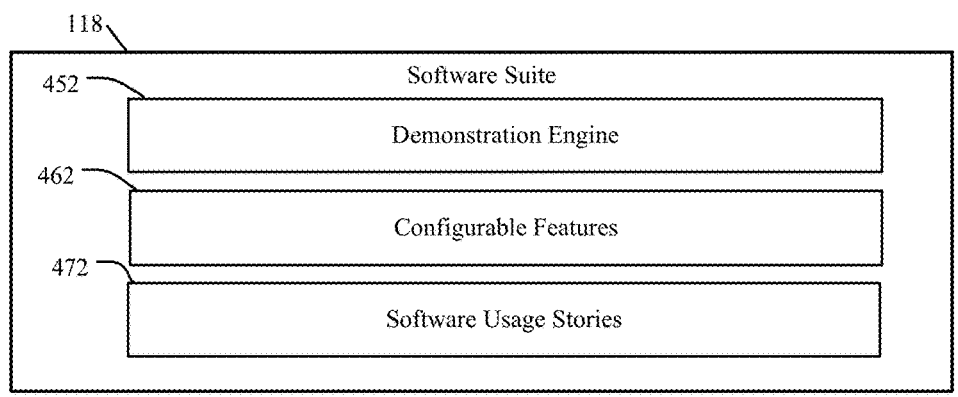
FIG. 4 Software Suite Block Diagram

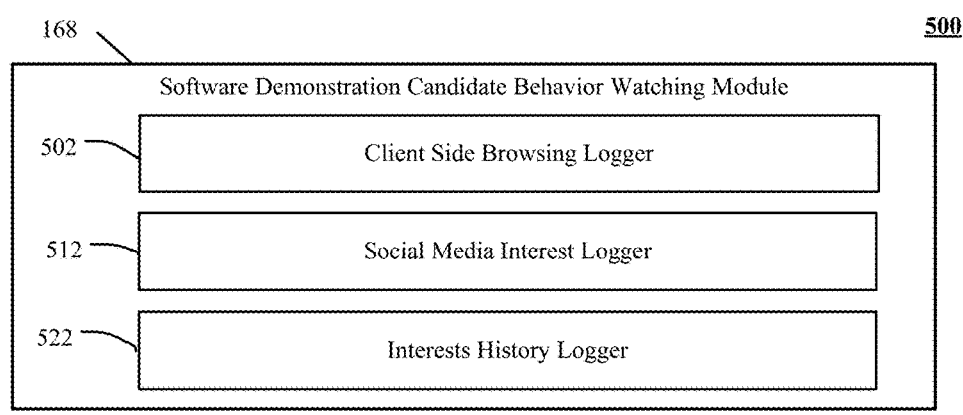
FIG. 5 Client Side Candidate Behavior Watching Module

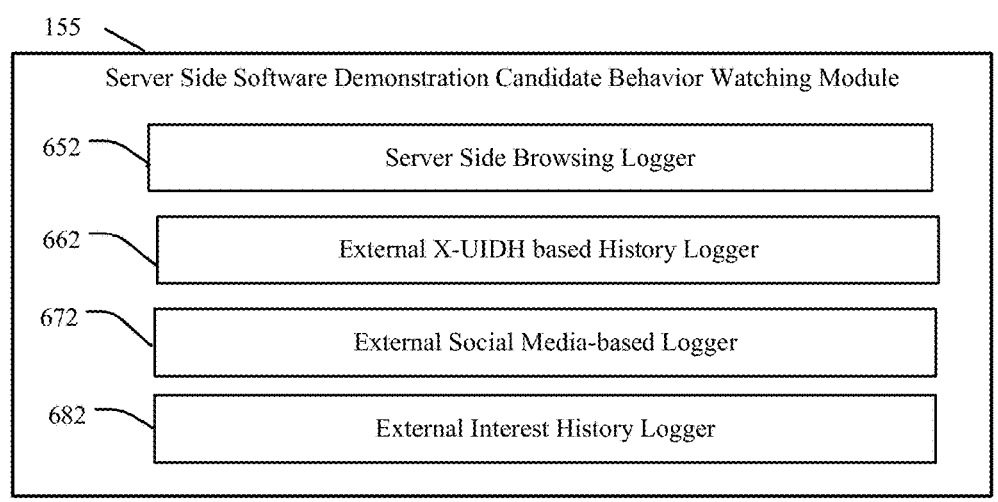
FIG. 6 Server Side Candidate Behavior Watching Module

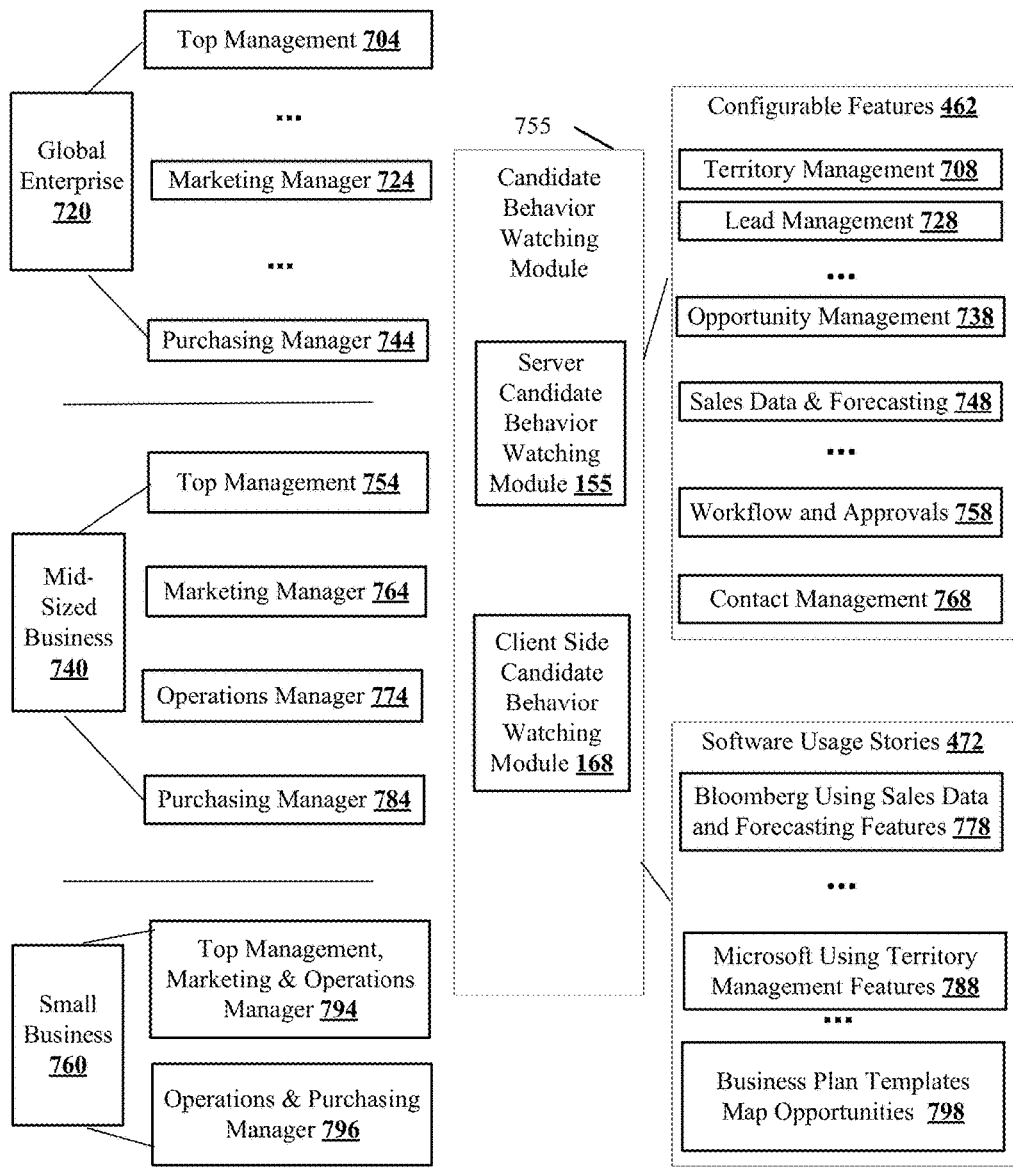
FIG. 7 Feature and Story Mapping Example

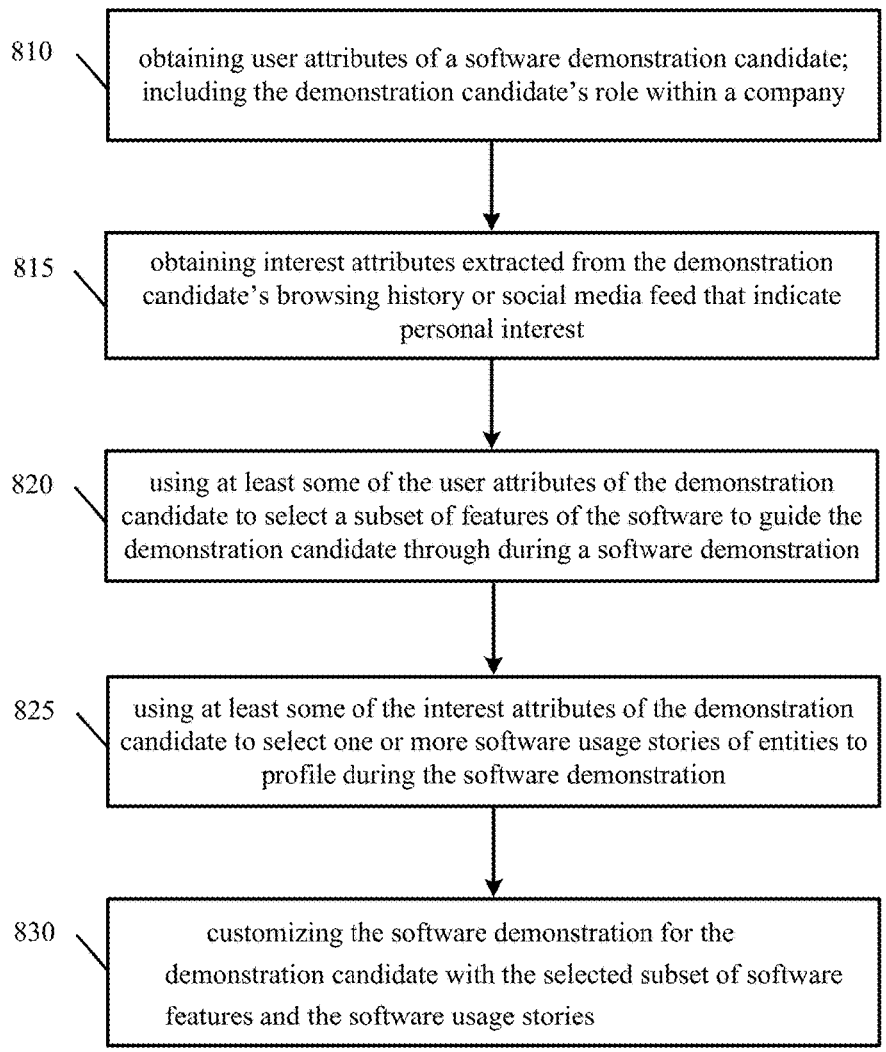
FIG. 8 Flow of Customization of a Trial Demonstration

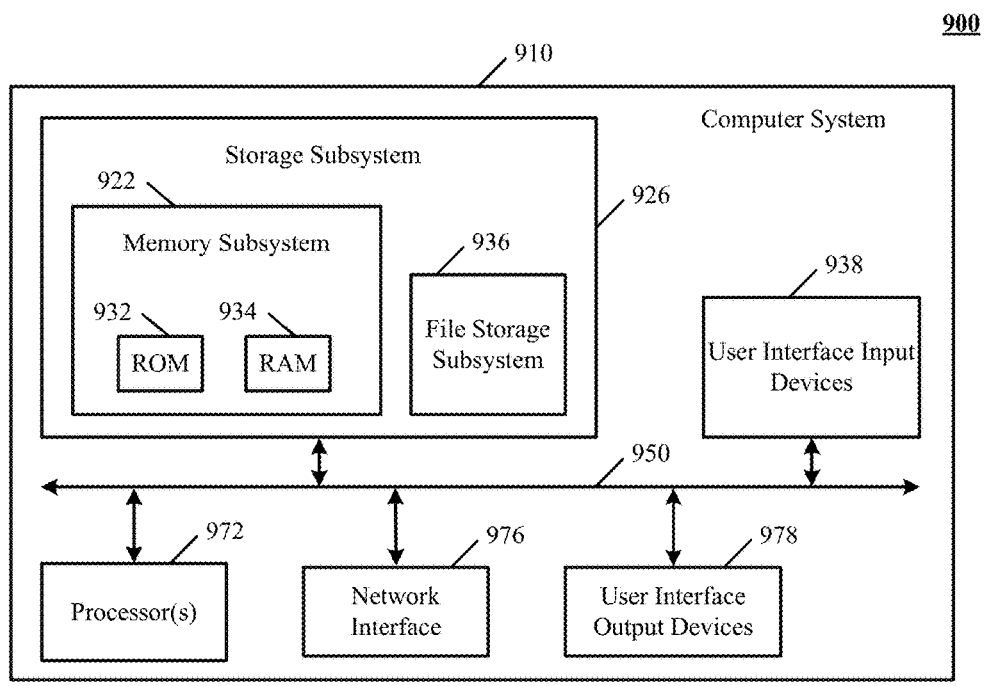
FIG. 9 Computer System

US 10,007,956 B2

SYSTEMS AND METHODS OF DATA MINING TO CUSTOMIZE SOFTWARE TRIAL DEMONSTRATIONS

RELATED APPLICATION

This application is a continuation of U.S. patent application Ser. No. 14/609,281, entitled "Systems and Methods if Data Mining to Customize Software Trial Demonstrations" filed 29 Jan. 2015. The non-provisional application is hereby incorporated by reference for all purposes.

INTRODUCTION

The technology disclosed describes systems and methods for delivering software trial demonstrations that are customized, with features identified as interesting to a software demonstration candidate, by mining biographical and behavioral data of the candidate. The technology further discloses systems and methods for the customization of trial demonstrations with software usage stories that reflect a software demonstration candidate's interests, identified by analyzing mined biographical and behavioral data about the candidate.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 illustrates one implementation of a customization environment.

FIG. 2A is one implementation of a software demonstration candidate data store for a customization environment.

FIG. 2B is one implementation of a data store for a feature and software usage story classifier for a demonstration customization environment.

FIG. 3 is a block diagram of a feature and story mapping module and a business segment and role module.

FIG. 4 is a block diagram for a software suite.

FIG. 5 is a block diagram of a client side software demonstration candidate behavior watching module.

FIG. 6 is a block diagram of a server side software demonstration candidate behavior watching module.

FIG. 7 shows a feature and story mapping example.

FIG. 8 is a flow of an example customization of a trial demonstration.

FIG. 9 an example computer system used for a customization environment.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Suites of software are commonly delivered using an online service model for many business applications, including customer relationship management (CRM) and enterprise resource planning (ERP). Cloud computing software suites typically include myriad feature options. To market a software suite with an extensive feature set, a business needs to determine ways to effectively demonstrate their software suite to software demonstration candidates.

The technology disclosed relates to data mining of potential software demonstration candidates' roles, online activities and interests to customize software trial demonstrations. By customizing a selection of features and emphasizing software usage stories based on the results of mining a candidate's interest and browsing data, a company can offer a software trial demonstration tailor-made for the candidate—thereby increasing sales of the company's software.

As an example of this concept, a small personal finance company with 25 employees needs a tool for managing their customer relationships with upper middle class consumers who are looking forward to retirement. Based on a review of mined data about the company's decision maker, we learn from her recent browsing history and social media interests that she is considering three customer-service software suite options: Zendesk, a platform that provides cloud-based customer service with various customer support features; Zoho, a web-based online office suite, and Salesforce Inc., that offers a CRM product with extensive features, plus commercial applications. We learn specifically from her stored profile that she is a regular reader of the Bloomberg News, and that her company wants an online tool to support lead generation for new clients. A feature and story mapping module customizes a software trial demonstration, using the candidate's data mined using a behavior watching module, to spotlight the lead generation feature and to include a software usage story that features a business leader she admires, who uses the lead generation feature successfully. Such a customized software trial demo would be useful to influence the opportunity for sales success for the software suite.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

The technology disclosed includes customizing a demonstration trial of an online software suite for a software demonstration candidate, after obtaining an identification of the candidate's company's business segment and the candidate's role in the company, and accessing the candidate's browsing history and social media to obtain expressions of candidate interest. In some implementations, a candidate's business segment and job role data map to selected businessrole-specific features for use with their customized trial demonstration. Additionally, a candidate's browsing history and their interests as expressed via social media can be used to select one or more candidate-admired companies to profile as examples of successes gained while utilizing the business-role specific selected features. The technology disclosed includes customizing a software suite demonstration trial for the candidate with the chosen palate of business-role-specific selected features and software usage stories that reflect selected candidate-admired companies.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

Customization Environment

FIG. 1 illustrates one implementation of a customization environment 100. FIG. 1 shows that environment 100 can include software demonstration candidate data store 112, feature and software usage story classifier data store 114, a feature and story mapping module 115, a business segment and role module 116, a software suite 118, and a network 125. Customization environment 100 further includes a social media access module 152, a server candidate behavior watching module 155, an ISP injection module 146, and a user computing device 158. In other implementations, environment 100 may not have the same elements as those listed above and/or may have other/different elements instead of, or in addition to, those listed above.

The software demonstration candidate data store 112 can include candidates' biographical and behavioral data. Biographical information identifies the candidate and/or the candidate's company. Identifying information can include business segment and job role data, such as company name, operating division, location, job title, normalized job responsibilities, past employment, education, and affiliations. Behavioral data can include browsing history or normalized data extracted from browsing history, and social media interactions such as recent business contacts, affiliations, mentions, subscriptions and other data that indicates or suggests which organizations the user or candidate admires. The supplemental information in the data store can include names of business leaders who they admire, number of employees for companies in their business segment, and other candidate-related information. Software demonstration candidate data store 112 includes different data types such as free-form text, structured text, and/or unstructured text. In some implementations, software demonstration candidate data store 112 can include URLs and web page content such as blog posts, as well as browsing history for videos, music and business contacts.

The feature and story mapping module 115 can include rules or classifiers that map candidate attributes to features and software usage stories of companies that use the software suite. Features are parts of a software application or service being demonstrated or tested. A software suite, for instance, often has many more features available than can be demonstrated in a relatively brief trial and includes both features that will be compelling and features that will never be used by a particular user. Software usage stories describe how particular companies have used the software suite to prosper. Individual candidates will consider success of various companies to be inspiring or marginally relevant. The technology disclosed automatically targets demonstration of selected features and recounting of particular software usage stories to meet interests of individual candidates based on their individual attributes. Trust features of the technology can be implemented to preserve the candidate's confidence that personal data is being used appropriately and for limited purposes, preferably with the candidate's knowledge and consent.

The feature and story mapping module 115 can access data stores to match user attributes to features and software usage stories to emphasize. In the feature and software usage story data store 114, business leaders can be identified with the companies, to assist in matching candidate data to motivating software usage stories. The feature and story mapping module 115 can include templates for organizing information in the software demonstration candidate data store 112, as well as rules or classifiers for mapping a candidate's industry segment, job role and other attributes to selected subsets of a product's suite of features. The feature and story mapping module 115 can also add to the attributes used for selection: the observed behavior of a particular candidate during the demonstration. That is, the feature and story mapping module 115 can adapt to the progress of a demonstration. The feature and story mapping module 115 can include rule or classifier based algorithms for mapping candidate email and browsing history 265 and candidate social media interests 275 to software suite features to be highlighted and software usage stories to display in a trial demonstration. Feature and software usage story classifier data store 114 includes different data types such as free-form text, structured text, and/or unstructured text. In some implementations, the feature and software usage story classifier data store 114 can include results obtained by running a machine learning training session using the data from the demonstration trials outcomes 285.

Software suite 118 can provide licensed software, in a cloud computing environment, typically with an extensive feature set and delivered on a subscription basis. In some implementations, software suite 118 is on-demand software that is accessed by users via a thin client via a web browser or mobile application. In many implementations, software suite 118 supports customization, in which configuration options can be altered for a single customer, to affect the look and feel and functionality of the software. For example, to support customers' common need to change an application's look and feel so that the application appears to have the customer's brand, the product can utilize a customer's logo and custom colors.

Server candidate behavior watching module 155 provides data to the software demonstration candidate data store 112 about the interests of candidates who opt in, giving their permission for the use of browsing information from commercial websites. This data may, for example, include a list of what products have been accessed via a candidate's browser—such as Zendesk, Zoho and ExactTarget Marketing Cloud. The server behavior watching module 155 can monitor browser cookies, and super cookies that include X-UIDH headers. This data may additionally include customer interest information gleaned from a candidate's social media use. Other implementations could be on an opt-out basis. Sometimes, behavior watching has been implemented without notice or with notice that users are likely to miss, which is not the preferred approach.

Social media access module 152 may include, but is not limited to access to Facebook, Twitter, LinkedIn, Chatter, Yelp, YouTube, Pandora, etc. In some implementations, social media access module 152 can be of varying types, including web browsers and mobile applications. Social media data may include information about company leaders, in their business segment, who are admired by the candidate.

In some implementations, the modules of customization environment 100 can be of varying types including workstations, servers, computing clusters, blade servers, server farms, or any other data processing systems or computing devices. Modules can be communicably coupled to the data store via a different network connection. For example, feature and story mapping module 115 and business segment and role module 116 can be coupled via the network 125 (e.g., the Internet) and server candidate behavior watching module 155 can be coupled to a direct network link. In some implementations, social media access module 152 may be connected via a WiFi hotspot. In some implementations, an ISP ID injection module 146 can be connected via the network 125 to a user computing device 158. The ISP ID injection module 146 adds a super cookie or X-UIDH—a unique combination of letters and numbers that can be decrypted to de-anonymize users and identify a candidate by a unique mobile directory number.

In some implementations, network(s) 125 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

User computing device 158 includes a web browser 178 and/or a mobile application 188, and a client behavior watching module 168 that provides data about the interests of candidates who opt in, thereby giving their permission for the use of their browsing information from commercial websites. The client behavior watching module 168 can monitor browser cookies to access customer interest information.

In some implementations, user computing device 158 can be a personal computer, laptop computer, tablet computer, smartphone, personal digital assistant (PDA), digital image capture devices, and the like.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

FIG. 2A shows a software demonstration candidate data store 112 that includes business segment data 245, job role data 255 and other data as described above. The server-side candidate behavior watching module 155 and the client-side candidate behavior watching module 168 provide email and browsing history 265, social media interests 275 and other data, or summaries or distillations thereof. Attributes of candidates stored in software demonstration candidate data store 112 include behavioral data mined from experiences with past software demonstration trials.

FIG. 2B shows a feature and software usage story classifier data store 114 with demonstration trials outcomes 285 and feature stickiness measurements 290. Software usage story attributes include data mined from experiences in hundreds to thousands of past demonstration trials of the software suite hundreds to thousands of data records of past trails. A machine learning training session makes use of an input test set of these attributes stored in demonstration trials outcomes 285 and stores results in a feature and story mapping module 115. Feature stickiness measurements 290 include data that captures each candidate's user experience with the demonstration trial, storing measurements of time spent exercising or viewing the features.

Feature-and-Story-Mapping and Business-Segment-and-Role Modules

FIG. 3 shows details of the feature and story mapping module 115. This module can include a rule set engine 332 and a demonstration building classifier engine 342. The rule set engine 332 identifies features and software usage stories that map to specific business segments and roles. In one case, a rule set engine 332 uses demonstration trials outcomes 285 to create a rule set that reflects patterns in previous software demonstration candidates' decision data as to whether to buy or not buy the software suite after participating in a specific trial demonstration. In another implementation, a rule set engine 332 makes use of result data gleaned from trial demonstration designs that deploy different stories and emphasize specific features before measuring candidates' responses.

In some implementations, candidates opt in for a personalized trial demonstration of a software suite. When opt-in applies, a candidate's demonstration is customized with the candidate's permission, using data from pre-existing sources and supplemental data provided by the candidate. Some implementations give the candidate the choice, alternatively, to go into privacy mode, to delete personal information stored by the company, or to use only information available from commercial websites. Rules or classifiers can map candidate attributes to software features and usage stories of companies that use the software suite. The company can then create an individualized trial demonstration for a candidate that matches their business needs, interests and job role.

FIG. 3 also displays a business segment and role module 116 that captures biographical information for candidates. In some implementations, a data capture module 352 includes a questionnaire and a response retrieval mechanism. A data logger 362 receives data when a candidate opts in to receive a trial demonstration for a software suite, and enters their job title, company name, education, past employment, age, assigned territory, etc.

In one example implementation, biographical data can be stored in a table with one row for each previous customer, with columns in the table storing their job title, company name, education, past employment, age, assigned territory, etc., a column storing the features the candidate experienced in a software demonstration trial, and a related column that includes a response or lack of response, to those features of a product.

FIG. 4 shows a software suite block diagram 400. A software suite demonstration engine 452 delivers trial demonstrations to candidates. A candidate can invite a company to install a software demonstration on their computer. Candidates can opt in to allow such a trial demonstration and the company can then customize the demonstration to match the candidate's business needs and interests, and to allow recording of their browsing history during the trial. To ensure customer privacy, the company providing the trial demonstration can provide an option for candidates to preview and edit their profile data in software demonstration candidate data store 112.

Software suites include a set of configurable features 462. Examples of configurable feature sets can include, among others, a call center management console, lead management console for sales, embedded analytics, sales community dashboard, report builder console, a purchasing workflow module, and a wealth management console. The rule set engine 332 or the demonstration building classifier engine 342 identifies configurable features 462 and software usage stories 472 that match a candidate's interests and role at a company. The demonstration engine 452 displays a customized software trial demonstration for the candidate. The demonstration engine 452 can also track progress through a trial and can store the state of the customized demonstration to support the ability of candidates to start a demo, leave for some period of time, and later resume from the point of departure in the trial demonstration.

Behavior Watching Modules

Behavior watching modules capture behavioral web-navigation information for candidates. FIG. 5 shows a client-side software demonstration candidate behavior watching module 168 that includes a client side browsing logger 502, a social media interest logger 512, and an interest history logger 522. The software demonstration candidate behavior watching module 168 has the ability to observe the entry of search keywords, the resultant links displayed, post-click metrics including dwell times, pages viewed, repeat visits, and post-click purchases or registrations. By aggregating a user's behavior, candidates' interests can often be determined. The results can be stored in the interest history logger 522. User sophistication with search engine usage and degree of category involvement can be determined over time.

In one example implementation, behavioral data can be stored in a table with one row for each previous customer, with columns in the table storing the features the candidate experienced in a software demonstration trial, and a related column that includes a response or lack of response, to those features of a product.

In some implementations, the software demonstration candidate behavior watching module 168 summarizes browser status and publishes the summary to an electronic record (e.g., a cookie) and communicates the record to a search engine or other site that the user contacts. The candidate behavior watching module 168 uses the information, for instance, to determine what types of products are of interest to a candidate. A customer service manager at a startup company who searches for "cloud-based platform" may get links for 'free' or 'reduced cost' cloud-based product options, while a marketing manager working at a global enterprise may get links for high-end cloud-based CRM platforms. Category profiles can be developed to further categorize a user's interests. A marketing manager for a wealth management company might be recognized based on content accessed and be assigned to receive links to a different category of marketing cloud platforms than a customer service manager at an IT support company. The technical result is to respond to a candidate based on an electronic report of the status or recent activity by a user, selecting a particular set of features and success stories that are most likely relevant to the current and recent inputs to a browser engine or mobile application. A data summary of web pages accessed gets stored in the client side browsing logger 502 and an interest history logger 522 tracks and logs interactions that signal interest by a candidate—both within accessed web pages and for mobile application interfaces. For example, in some implementations, a candidate may have searched for "Microsoft dynamics" or "Microsoft CRM" within the last week. Of the half-dozen potential walkthroughs to include in this candidate's sidebar during a demonstration trial, we could include one about Microsoft Outlook integration.

The candidate behavior watching module 168 includes a social media interest logger 512. For example, for a candidate that joins an Obama for America campaign online, we could infer their political interest and display marketing material developed during the 2012 political campaign in their sidebar.

FIG. 6 shows a server-side candidate behavior watching module 155 that can include a server side browsing logger 652, an external X-UIDH based history logger 662, an external social media-based logger 672, and an external interest history logger 682.

External X-UIDH based history logger 662 monitors and stories data from a cookie-like tracker that has been inserted into a header by an ISP ID Injection Module 146 to uniquely identify users to the websites they visit. In some implementations, the network level header between the user's device (s) and the servers with which the user interacts is tied to a data plan, so anyone who browses the web through a hotspot, or shares a computer that uses cellular data, gets the same X-UIDH header as everyone else using that hotspot or computer, making it possible to build a profile that includes private browsing activity. The X-UIDH header is nearly invisible to the user and can't be seen or changed in the device's browser settings. If a user clears their cookies, the X-UIDH header remains unchanged. Ad networks can immediately assign new cookies and link them to the cleared cookies using the unchanged X-UIDH value. One unique X-UIDH header value is shared with the unencrypted websites a user visits, making it easier to track that user across many sites. Browsers provide Incognito Mode or Private Browsing Mode in order to defeat some kinds of tracking, but the X-UIDH header, since it is injected at the network layer, ignores those modes. Disabling third-party cookies in browser settings does nothing to stop the X-UIDH header.

In some implementations, a social media management system taps into sources from Twitter, Facebook, LinkedIn, YouTube, blogs, news, etc. to hear what's being said tracking, monitoring, and reacting to comments, questions, and complaints as they happen. Social media analytics make it possible for users to understand the social posts enhancing those conversations with meaningful insights on everything from sentiment, demographics, trends, intent, and more. In one implementation, these software analytics are stored in social media interest logger 512.

As another example, in some implementations, decisions—about features and sidebar stories for demonstration trials—can be made based on the results of searching a table of known companies for an intersection between the candidate's company name and known competitors of the candidate's company. Sidebar content in the demonstration trial can be customized for the first-degree competitors, and for the competitors that are customers of the company providing the demonstration trial. The sidebar can feature sample data such as "Competitor X can use Feature Y to more efficiently market to its competitors' customers."

Example of Mapping Features and Stories

In some implementations different business segments have diverse roles for candidates. Examples of business segments include global enterprises, mid-sized businesses, and small businesses. FIG. 7 is a block diagram of an example feature and story mapping—mapping from business segment, job role and other candidate attribute data to a feature set for customization of the trial demonstration 462 and software usage stories 472. For a global enterprise 720, a software suite is often a big ticket item and sales cycles can be long due to the number of decision makers in the enterprise who need to concur prior to completion of the sale. Software demonstration candidates who are interested in viewing a trial demonstration come from diverse job roles, such as top management 704, marketing 724, and purchasing 744. As an example, a top manager who is a software demonstration candidate may be interested in territory management 708. This manager, who reads the Bloomberg News online on a regular basis, has recently navigated through a series of news announcements about Microsoft, using the territory management 708 feature set of the product to broaden sales.

The candidate behavior watching module 755 generates inputs to a rule set engine 332 or demonstration building classifier engine 342. In one implementation the rule set identifies a customized trial demonstration for the top manager candidate: a feature set that emphasizes territory management 708 as a primary feature and a software usage story about Microsoft using territory management features 788. In another implementation, the classifier will likely recommend the same customized trial demonstration for the top manager candidate: a feature set that emphasizes territory management 708 as a primary feature and a software usage story about Microsoft using territory management features 788.

In contrast, for a mid-sized business 740, sales opportunities and sales cycles for a software suite are typically be more modest to serve fewer employees and with a smaller group of decision makers who approve software suite purchases. For example, top management 754 of a mid-sized company may have little need for a feature focused on territory management 708. Instead, the feature of interest may be opportunity management 738. For this software demonstration candidate, the classifier output identifies a customized trial demonstration that configures the feature—opportunity management 738. Based on browsing history 265, the classifier decides to include a software usage story about business plan templates that map opportunities 798.

Similarly, the candidate behavior watching module 755 generates inputs to a rule set engine 332 for a software demonstration candidate for a small business 760. The rule set maps to an interest in workflow and approvals 758 for a customized trial demonstration for the purchasing manager candidate: a feature set that emphasizes workflow and approvals 758 as a primary feature and a software usage story about Bloomberg using sales data and forecasting features 778. In another case, the demonstration classifier engine 342 suggests a similar feature subset and story.

Rule Set for Features and Success Stories for Demonstration Trials

In some implementations, a rule engine 332 maps candidate attributes to features and/or stories. The knowledge base can include previous software demonstration candidates' decision data as to whether to buy or not buy the software suite after participating in a specific trial demonstration. In one case, a rule set engine 332 uses demonstration trials outcomes 285 to create a rule set that reflects patterns in previous software demonstration candidates' decision data. A rule set engine 332 can include if-then rules that can be used by inference to decide which features and stories to use for a demonstration candidate's trial demonstration, mapping a candidate's interest attributes to features and software usage stories to select.

Alternatively, a rule set engine 332 can make use of result data gleaned from trial demonstration designs that deploy different stories and emphasize specific features before measuring candidates' responses. In this case, the knowledge base can be divided up into multiple possible views, aka worlds. This allows the inference engine to explore multiple possibilities in parallel. The results based on the various designs deployed can be used to power the if-then rules for inferring choices for future candidates' trial demonstration configurations.

Classifiers for Features and Success Stories for Demonstration Trials

Demonstration building classifier engine 352 implements a machine learning training session using data from hundreds to thousands of demonstration trials as a training set and stores the results of the machine learning in the feature and software usage story classifier data store 114. For example, demonstration building classifier engine 352 can initialize a feature and software usage story classifier data store 114 and then connect user attributes, including a subset of features available in a software suite under demonstration trial, and at least one customer software usage story of using the software suite. The demonstration building classifier engine 352 can access users' business segment data 245 and job role data 255 that includes job functions or titles from hundreds to thousands of demonstration trials.

Success stories can be preprocessed to create a candidate attributes to feature mapping 294, and candidate attributes to story mapping 296. The demonstration building classifier engine 352 makes use of a candidate's background data comprising email and browsing history 265 or social media interests 275, as well as users' experience with the demonstration trial comprising time spent exercising or viewing the features—sometimes referred to as feature stickiness measurements 290.

Classification can be implemented using collaborative filtering to make automatic predictions about the features of interest to a candidate based on the collective preferences or taste information from many users. For example, if candidate A's data records match user B's data records for business segment and job role, and for at least some minimum browsing history data, then candidate A is more likely to react positively to the same specific feature set recorded for user B than for a random feature set for a demonstration trial.

In another example, demonstration building classifier engine 352 can be implemented using logistic regression to measure the relationship between a software usage story recorded as successful for user B and one or more feature sets, using probability scores as the predicted values of the feature set being successful to sell a software suite using a demonstration trial.

In some implementations, demonstration building classifier engine 352 can be implemented using support vector machines (SVMs) to analyze demonstration trials outcomes 285 and feature stickiness measurements 290 to decide what software usage story and feature set to use for a candidate's demonstration trial. Given a set of features and success stories as training examples, each marked as belonging to a product selling success or failure category, the SVM training algorithm builds a model that assigns new examples into either a product-selling success or failure—represented as points in space, mapped so that the examples of the product-selling success and failure categories are divided by a clear gap that is as wide as possible. New examples can be mapped and predicted to belong to a category based on which side of the gap they fall on. Then, the classifier can use the feature and software usage story classifier to select features to emphasize during a demonstration trial and to select the customer success stories to emphasize for a particular user based on the machine learning analysis of the multitude of demonstration trials.

Implementation of Customization of a Software Trial Demo

FIG. 8 is a flowchart 800 of one implementation of a trial demonstration customization environment. Flowchart 800 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations. For convenience, this flowchart is described with reference to the system that carries out a method. The system is not necessarily part of the method.

At action 810, for each of a plurality of candidate users of a software demonstration, user attributes of a software demonstration candidate are obtained; including the demonstration candidate's role within a company.

At action 815, interest attributes extracted from the demonstration candidate's browsing history or social media feed that indicate personal interest are obtained.

At action 820, a subset of features of the software to guide the demonstration candidate through, are selected using at least some of the user attributes of the demonstration candidate during a software demonstration.

At action 825, one or more software usage stories of entities to profile during the software demonstration are selected, using at least some of the interest attributes of the demonstration candidate.

At action 830, the software demonstration for the demonstration candidate is customized with the selected subset of software features and the software usage stories.

Computer System

FIG. 9 is a block diagram of an example computer system 900. FIG. 9 is a block diagram of an example computer system, according to one implementation. The processor can be an ASIC or RISC processor. It can be an FPGA or other logic or gate array. It can include graphic processing unit (GPU) resources. Computer system 910 typically includes at least one processor 972 that communicates with a number of peripheral devices via bus subsystem 950. These peripheral devices may include a storage subsystem 926 including, for example, memory devices and a file storage subsystem, user interface input devices 938, user interface output devices 978, and a network interface subsystem 976. The input and output devices allow user interaction with computer system 910. Network interface subsystem 976 provides an interface to outside networks, including an interface to corresponding interface devices in other computer systems.

User interface input devices 938 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 910.

User interface output devices 978 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules and methods described herein. These software modules are generally executed by processor 972 alone or in combination with other processors.

Memory 922 used in the storage subsystem can include a number of memories including a main random access memory (RAM) 934 for storage of instructions and data during program execution and a read only memory (ROM) 932 in which fixed instructions are stored. A file storage subsystem 936 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 336 in the storage subsystem 926, or in other machines accessible by the processor.

Bus subsystem 950 provides a mechanism for letting the various components and subsystems of computer system 910 communicate with each other as intended. Although bus subsystem 950 is shown schematically as a single bus, alternative implementations of the bus subsystem may use multiple busses.

Computer system 910 can be of varying types including a workstation, server, to computing cluster, blade server, server farm, or any other data processing system or computing device. Due to the ever-changing nature of computers and networks, the description of computer system 910 depicted in FIG. 9 is intended only as one example. Many other configurations of computer system 910 are possible having more or fewer components than the computer system depicted in FIG. 9.

Particular Implementations

In one implementation, a computer system is implemented to customize a demonstration of a software suite with numerous features and deployments. The computer implemented system includes a processor, memory coupled to the processor, and program instructions stored in the memory that implement a method comprising obtaining user attributes of a software demonstration candidate from a user such as a user profile, and social profiles from directories such as LinkedIn. Attributes obtained can include a subset of the demonstration candidate's role within a company, education, past employment, affiliations, endorsements, skills, residence address, work address, assigned territory, the company's business segment, competitors, and product line. This method disclosed includes obtaining interest attributes extracted from the demonstration candidate's browsing history or social media feed that indicate personal interest of the demonstration candidate in entities using the software; and using at least some of the user attributes of the demonstration candidate to select a subset of features of the software to guide the demonstration candidate through during a software demonstration. The system further includes using at least some of the interest attributes of the demonstration candidate to select one or more software usage stories of entities to profile during the software demonstration; and customizing the software demonstration for the demonstration candidate with the selected subset of software features and the software usage stories.

A feature of the disclosed implementation includes obtaining at least some of the user attributes by presenting the demonstration candidate with a questionnaire and receiving responses. The disclosed system further includes receiving permission from the demonstration candidate to access at least one social profile of the demonstration candidate and accessing the social profile. An additional feature of the disclosed system and method includes accessing and applying at least one rule set that maps the user attributes to subsets of features to select; and further includes accessing and applying at least one rule set that maps the interest attributes to software usage stories to select.

In some implementations, the computer implemented system includes applying a trained classifier to the user attributes and the interest attributes to select the subset of features and the software usage stories; and further includes as user attributes of the demonstration candidate at least education, past employment, and assigned territory, as well as affiliations, endorsements and skills. The computer implemented system also includes as user attributes of the demonstration candidate at least product line responsibility, and the identity of other companies that compete with the company.

This system and other implementations of the technology disclosed can include one or more of the following features and/or features described in connection with additional systems disclosed. In the interest of conciseness, the combinations of features disclosed in this application are not individually enumerated and are not repeated with each base set of features.

Other implementations may include a method to perform any of the processes described above. Yet another implementation may include a tangible computer-readable memory including computer program instructions that cause a computer to implement any of the computer implemented methods described above.

In one implementation, a method is disclosed for applying a trained classifier to the user attributes and the interest attributes to select the subset of features and the software usage stories. The method further includes training the classifier. The disclosed method includes for a test set of data—accessing user attribute and interest attribute data for demonstration users of the software; accessing at least user dwell times during use of particular features and viewing of particular software usage stories by the demonstration users. The method includes using at least the user attribute and interest attribute data as independent variables and at least the user dwell times as dependent variables, training the classifier to select for demonstration candidates a subset of features of the software application and to select one or more software usage stories and producing classifier parameters that implement the trained classifier. The method further includes using the classifier parameters for the customizing of the software demonstration.

For some implementations, a disclosed method of training a classifier to customize a software demonstration for a demonstration candidate with a selected subset of software features and one or more software usage stories, includes, for a test set of data, accessing user attribute and interest attribute data for demonstration users of a software application and accessing at least user dwell times during use of particular features and viewing of particular software usage stories for the demonstration users.

The method disclosed further includes using at least the user attribute and interest attribute data as independent variables and at least the user dwell times as dependent variables for training the classifier to select for demonstration candidates a subset of features of the software application and to select one or more software usage stories, and produce classifier parameters that implement the trained classifier; and then store the classifier parameters for later use.

For some implementations, a method includes applying a trained classifier to the user attributes and the interest attributes to select the subset of features and the software usage stories.

For some implementations, a method further includes, as user attributes of the demonstration candidate, at least residence address or work address, product line responsibility, or both.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A computer implemented system applied to customizing a demonstration of a software suite with numerous features and deployments, the computer implemented system including:
a processor, memory coupled to the processor, and program instructions stored in the memory that implement a method comprising:
obtaining from at least one of a user profile and a social profile, at least some user attributes for a demonstration candidate, including a role of the demonstration candidate within a demonstration candidate's company;
obtaining interest attributes for the demonstration candidate including known competitors of the demonstration candidate's company extracted from searching in a table of known companies for an intersection between the demonstration candidate's company and known competitors of the demonstration candidate's company;
using at least some of the user attributes for the demonstration candidate to select a subset of features of the software suite to guide the demonstration candidate through during a software demonstration, to include:
accessing and automatically applying at least one trained classifier rule set that maps the user attributes determined for the demonstration candidate to subsets of features in the software suite to select based on parameters of the trained classifier rule set;
using at least some interest attributes of the demonstration candidate to select one or more software usage stories describing successful implementation of the software suite by business entities determined to be potential customers of known competitors of the demonstration candidate's company to profile during the software demonstration; and
customizing the software demonstration for the demonstration candidate with a selected subset of features in the software suite and the software usage stories; and
at least initializing presentation across a display screen of the software demonstration to the demonstration candidate.

2. The computer implemented system of claim 1, further including obtaining additional user attributes by presenting the demonstration candidate with a questionnaire and receiving responses.

3. The computer implemented system of claim 1, further including receiving permission from the demonstration candidate to access the social profile of the demonstration candidate and accessing the social profile.

4. The computer implemented system of claim 1, further including features to more efficiently market the software suite to a demonstration candidate's company's competitors' customers.

5. The computer implemented system of claim 1, further including accessing and applying at least one rule set that maps the interest attributes to software usage stories to select.

6. The computer implemented system of claim 1, further including applying the trained classifier rule set to the user attributes and the interest attributes to select the subset of features and the software usage stories.

7. The computer implemented system of claim 6, further including training a classifier, the method including:
- for a test set of data, accessing user attribute and interest attribute data for demonstration users of the software suite;
- for the test set of data, accessing at least user dwell times during use of particular features and viewing of particular software usage stories by the demonstration users;
- using at least the user attribute and interest attribute data as independent variables and at least the user dwell times as dependent variables, training the classifier to select for demonstration candidates a subset of features of the software suite and to select one or more software usage stories and producing classifier parameters that implement the classifier; and
- using the classifier parameters for the customizing of the software demonstration.

8. The computer implemented system of claim 1, further including as user attributes of the demonstration candidate at least education, past employment, and assigned territory.

9. The computer implemented system of claim 1, further including as user attributes of the demonstration candidate at least affiliations, endorsements and skills.

10. The computer implemented system of claim 1, further including as user attributes of the demonstration candidate at least product line responsibility.

11. The computer implemented system of claim 1, further including as user attributes of the demonstration candidate, other companies that compete with the demonstration candidate's company.

12. The computer implemented system of claim 1, further comprising a personal interest including admiration of the demonstration candidate for a business leader at the business entities determined to be potential customers of known competitors of the demonstration candidate's company.

13. A non-transitory computer readable storage medium that stores program instructions that implement a method of customizing a demonstration of a software suite with numerous features and deployments, which implementation includes:
- obtaining from at least one of a user profile and a social profile, at least some user attributes for a demonstration candidate, including a role of the demonstration candidate within a demonstration candidate's company;
- obtaining interest attributes for the demonstration candidate including known competitors of the demonstration candidate's company extracted from searching in a table of known companies for an intersection between the demonstration candidate's company and known competitors of the demonstration candidate's company;
- using at least some of the user attributes for the demonstration candidate to select a subset of features of the software suite to guide the demonstration candidate through during a software demonstration, to include:
  - accessing and automatically applying at least one trained classifier rule set that maps the user attributes determined for the demonstration candidate to subsets of features in the software suite to select based on parameters of the trained classifier rule set;
  - using at least some interest attributes of the demonstration candidate to select one or more software usage stories describing successful implementation of the software suite by business entities determined to be potential customers of known competitors of the demonstration candidate's company to profile during the software demonstration; and
- customizing the software demonstration for the demonstration candidate with a selected subset of features in the software suite and the software usage stories; and
- at least initializing presentation across a display screen of the software demonstration to the demonstration candidate.

14. The non-transitory computer readable storage medium of claim 13, further including obtaining additional user attributes by presenting the demonstration candidate with a questionnaire and receiving responses.

15. The non-transitory computer readable storage medium of claim 13, further including features to more efficiently market the software suite to a demonstration candidate's company's competitors' customers.

16. The non-transitory computer readable storage medium of claim 13, further including accessing and applying at least one rule set that maps the interest attributes to software usage stories to select.

17. The non-transitory computer readable storage medium of claim 13, further including applying the trained classifier rule set to the user attributes and the interest attributes to select the subset of features and the software usage stories.

18. The non-transitory computer readable storage medium of claim 17, further including training a classifier, the method including:
- for a test set of data, accessing user attribute and interest attribute data for demonstration users of the software suite;
- for the test set of data, accessing at least user dwell times during use of particular features and viewing of particular software usage stories by the demonstration users;
- using at least the user attribute and interest attribute data as independent variables and at least the user dwell times as dependent variables, training the classifier to select for demonstration candidates a subset of features of the software suite and to select one or more software usage stories and producing classifier parameters that implement the classifier; and
- using the classifier parameters for the customizing of the software demonstration.

19. The non-transitory computer readable storage medium of claim 17, further comprising: a personal interest including admiration of the demonstration candidate for a business leader at the business entities determined to be potential customers of known competitors of the demonstration candidate's company.

* * * * *